United States Patent
Joung et al.

(10) Patent No.: US 10,136,414 B2
(45) Date of Patent: Nov. 20, 2018

(54) OPERATING METHOD OF ENB FOR CGI INFORMATION REPORTING IN WIRELESS COMMUNICATION SYSTEM

(71) Applicant: INNOWIRELESS CO., LTD., Gyeonggi-do (KR)

(72) Inventors: Jin Soup Joung, Gyeonggi-do (KR); Seung Hwan Ji, Gyeonggi-do (KR); Seo Kyun Jang, Gyeonggi-do (KR); Yong Hee Kim, Gyeonggi-do (KR)

(73) Assignee: Qucell Networks Co., Ltd., Gyeonggi-do (KR)

( * ) Notice: Subject to any disclaimer, the term of this patent is extended or adjusted under 35 U.S.C. 154(b) by 251 days.

(21) Appl. No.: 14/626,521

(22) Filed: Feb. 19, 2015

(65) Prior Publication Data
US 2016/0198340 A1    Jul. 7, 2016

(30) Foreign Application Priority Data
Jan. 5, 2015 (KR) .................. 10-2015-0000911

(51) Int. Cl.
*H04W 24/02* (2009.01)
*H04W 24/10* (2009.01)
(Continued)

(52) U.S. Cl.
CPC ... *H04W 72/0406* (2013.01); *H04W 36/0083* (2013.01); *H04W 52/0216* (2013.01);
(Continued)

(58) Field of Classification Search
None
See application file for complete search history.

(56) References Cited

U.S. PATENT DOCUMENTS

2010/0330992 A1*  12/2010  Bhattacharjee ..... H04W 52/028
                                                         455/436
2014/0073306 A1*  3/2014   Shetty ............... H04W 36/0088
                                                         455/418
(Continued)

FOREIGN PATENT DOCUMENTS

KR   1020080091639 A   10/2008
KR   1020100049399 A    5/2010
(Continued)

*Primary Examiner* — Kevin C. Harper
*Assistant Examiner* — Derrick V Rose
(74) *Attorney, Agent, or Firm* — Kaplan Breyer Schwarz, LLP

(57) ABSTRACT

A resource allocation algorithm and operation procedure for user equipment (UE) to efficiently report cell global identity (CGI) information to an evolved node base station (eNB) in an automatic neighbor relation (ANR) operation procedure in a wireless communication system. According to an operating method of an eNB for
CGI information reporting in a wireless communication system, a serving eNB receives a CGI information report and perform an ANR operation to maintain service quality through effective handover of UE at the edge of the service area of the serving eNB. When there is uplink/downlink data, the serving eNB stops data allocation to the UE and requests measurement reports (MRs) of neighbor eNBs, and the UE can be switched to a discontinuous reception (DRX) state during a DRX-inactivity time. Accordingly, it is possible to ensure decoding of a broadcast channel (BCH) of a neighbor cell and report CGI information.

2 Claims, 6 Drawing Sheets

(51) Int. Cl.
*H04W 72/04* (2009.01)
*H04W 36/00* (2009.01)
*H04W 52/02* (2009.01)
*H04W 88/08* (2009.01)
*H04W 76/28* (2018.01)

(52) U.S. Cl.
CPC ....... *H04W 52/0219* (2013.01); *H04W 72/04* (2013.01); *H04W 76/28* (2018.02); *H04W 88/08* (2013.01); *Y02D 70/122* (2018.01); *Y02D 70/1262* (2018.01); *Y02D 70/24* (2018.01)

(56) References Cited

U.S. PATENT DOCUMENTS

| | | | | |
|---|---|---|---|---|
| 2015/0319744 | A1* | 11/2015 | Jung | H04W 24/10 370/328 |
| 2015/0365900 | A1* | 12/2015 | Kanamarlapudi | H04W 52/0241 370/311 |
| 2015/0365994 | A1* | 12/2015 | Yu | H04W 76/028 370/336 |
| 2016/0050626 | A1* | 2/2016 | Chen | H04W 76/048 370/311 |

FOREIGN PATENT DOCUMENTS

| | | |
|---|---|---|
| KR | 1020100104022 A | 9/2010 |
| KR | 1020110038852 A | 4/2011 |
| KR | 1020130003321 A | 1/2013 |
| KR | 1020130065902 A | 6/2013 |
| KR | 1020140002904 A | 1/2014 |

\* cited by examiner

OPERATING METHOD OF ENB FOR CGI INFORMATION REPORTING IN WIRELESS COMMUNICATION SYSTEM

CROSS-REFERENCE TO RELATED APPLICATION

This application claims priority to and the benefit of Korean Patent Application No. 10-2015-0000911, filed on Jan. 5, 2015, the disclosure of which is incorporated herein by reference in its entirety.

FIELD OF THE INVENTION

The present invention relates to an operating method of an evolved node base station (eNB) for cell global identity (CGI) information reporting in a wireless communication system, and more particularly, to a resource allocation algorithm and operation procedure for user equipment (UE) to efficiently report CGI information to an eNB in an automatic neighbor relation (ANR) operation procedure in a wireless communication system.

BACKGROUND OF THE INVENTION

Long Term Evolution (LTE) technology provides a variety of methods of reporting CGI information of UE to a small cell or a macro eNB.

As a related art of the present invention, Korean Unexamined Patent Publication No. 10-2010-0049399 A shown in FIG. 1 discloses a method and apparatus for controlling a discontinuous reception (DRX) operation in a mobile communication system. This technology relates to a method and apparatus for controlling a DRX operation in a mobile communication system, and includes an operation of stopping a DRX operation of UE when a radio resource control (RRC) connection reconfiguration procedure begins, an operation of transmitting, by the UE, an RRC connection reconfiguration request message to an eNB which is a target of RRC connection reconfiguration, and transmitting, by the eNB receiving the RRC connection reconfiguration request message, an RRC connection reconfiguration message to the UE, and an operation of receiving, by the UE, the RRC connection reconfiguration message and resuming the DRX operation.

As another related art of the present invention, Korean Unexamined Patent Publication No. 10-2014-0002904 A shown in FIG. 2 discloses a method of reporting CGI information in a wireless communication method. This technology is characterized by the method of reporting CGI information including: operation (a) of receiving broadcasting channel information of a second eNB in a DRX period set by a first eNB; operation (b) of acquiring CGI information of the second eNB in advance from the broadcasting channel information without a CGI information request from the first eNB; operation (c) of receiving a connection re-establishment request message including DRX configuration information and a CGI information request message from the first eNB after receiving the broadcasting channel information of the second eNB; and operation (d) of reporting the CGI information of the second eNB to the first eNB in response to the connection re-establishment request message.

This work was supported by the ICT R&D program of MSIP/IITP, Republic of Korea. [14-000-04-001, Core Technology Development of 5G mobile communication for Hyper-connectivity smart mobile service]

RELATED DOCUMENTS

1. Korean Patent Publication No. 10-2010-0049399 A
2. Korean Patent Publication No. 10-2014-0002904 A
3. Korean Patent Publication No. 10-2010-0104022 A
4. Korean Patent Publication No. 10-2011-0038852 A
5. Korean Patent Publication No. 10-2013-0065902 A
6. Korean Patent Publication No. 10-2008-0091639 A
7. Korean Patent Publication No. 10-2013-0003321 A

SUMMARY OF THE INVENTION

The present invention is directed to providing an operating method of an evolved node base station (eNB) for cell global identity (CGI) information reporting in a wireless communication system in which, when there is uplink/downlink data in an eNB of a mobile communication system, a serving eNB stops data allocation to user equipment (UE) and requests measurement reports (MRs) of neighbor eNBs, and thus the UE is switched to a discontinuous reception (DRX) state during a DRX-inactivity time to ensure decoding of a broadcast channel (BCH) of a neighbor cell and reports CGI information, such that service quality can be maintained.

According to an aspect of the present invention, there is provided an operating method of an eNB for CGI information reporting in a wireless communication system, the method including: requesting, by a serving eNB for UE among eNBs, MRs on neighbor eNBs from the UE using a radio resource control (RRC) connection reconfiguration message resulting from an event; performing, by the UE, measurement of the neighbor eNBs and then transmitting an MR on the event whose condition is satisfied to the serving eNB; receiving, by the serving eNB, the MR, providing DRX configuration information of the UE using an RRC connection reconfiguration message, and stopping uplink/downlink data resource allocation to the UE to request CGI information from the UE; decoding, by the UE, a BCH of a neighbor cell to acquire CGI information in a DRX state; reporting, by the UE, the CGI information to the serving eNB before a T321 cycle expires; storing, by the serving eNB, the reported CGI information, updating a neighbor list, and resuming uplink/downlink data resource allocation to the UE from which CGI information has been requested and reported; and stopping, by the serving eNB, a timer operated on a cycle T with a repeat count R.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

The following description only exemplifies the principle of the present invention. Those of ordinary skill in the art can embody the principle of the present invention and invent various apparatuses, even those not clearly described or illustrated in this specification, within the scope and concept of the present invention. In principle, all conditional terms and embodiments described in the specification are intended to facilitate understanding of the concept of this invention, and the present invention should not be understood as being limited to the described embodiments or conditions. Also, it is to be appreciated that not only the principles, viewpoints, and embodiments of the present invention, but also all detailed descriptions listing the particular embodiments are intended to include structural and functional equivalents thereof.

The aforementioned objectives, features, and advantages will be further clarified by the detailed description. In describing the present invention, detailed description of related art will be omitted when it is deemed to unnecessarily obscure the gist of the invention. Hereinafter, exemplary embodiments of the present invention will be described in detail with reference to the accompanying drawings.

Figure 1:
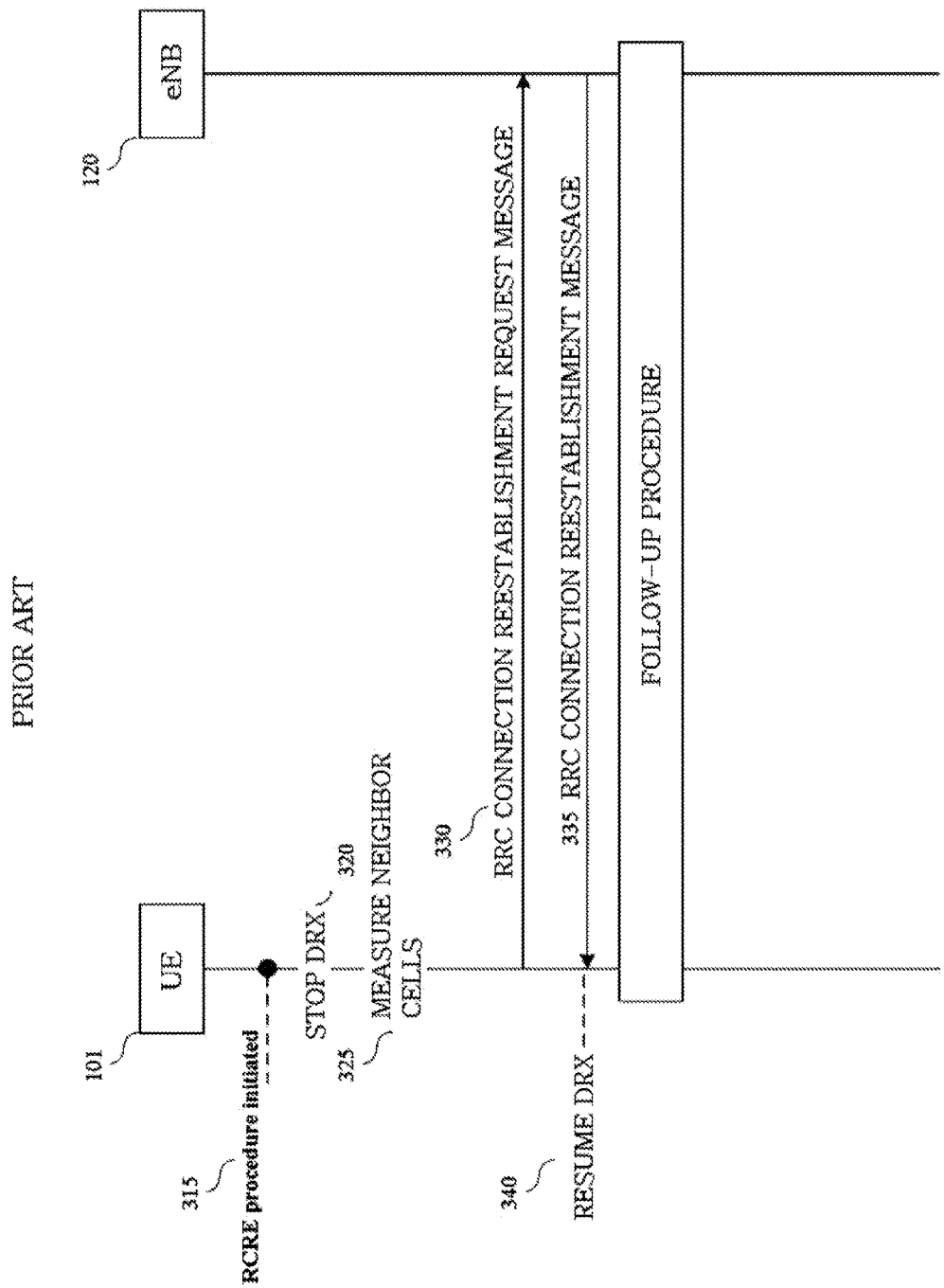
FIG. 1 illustrates a method and apparatus for controlling a discontinuous reception (DRX) operation in a mobile communication system as a related art.
Figure 2:
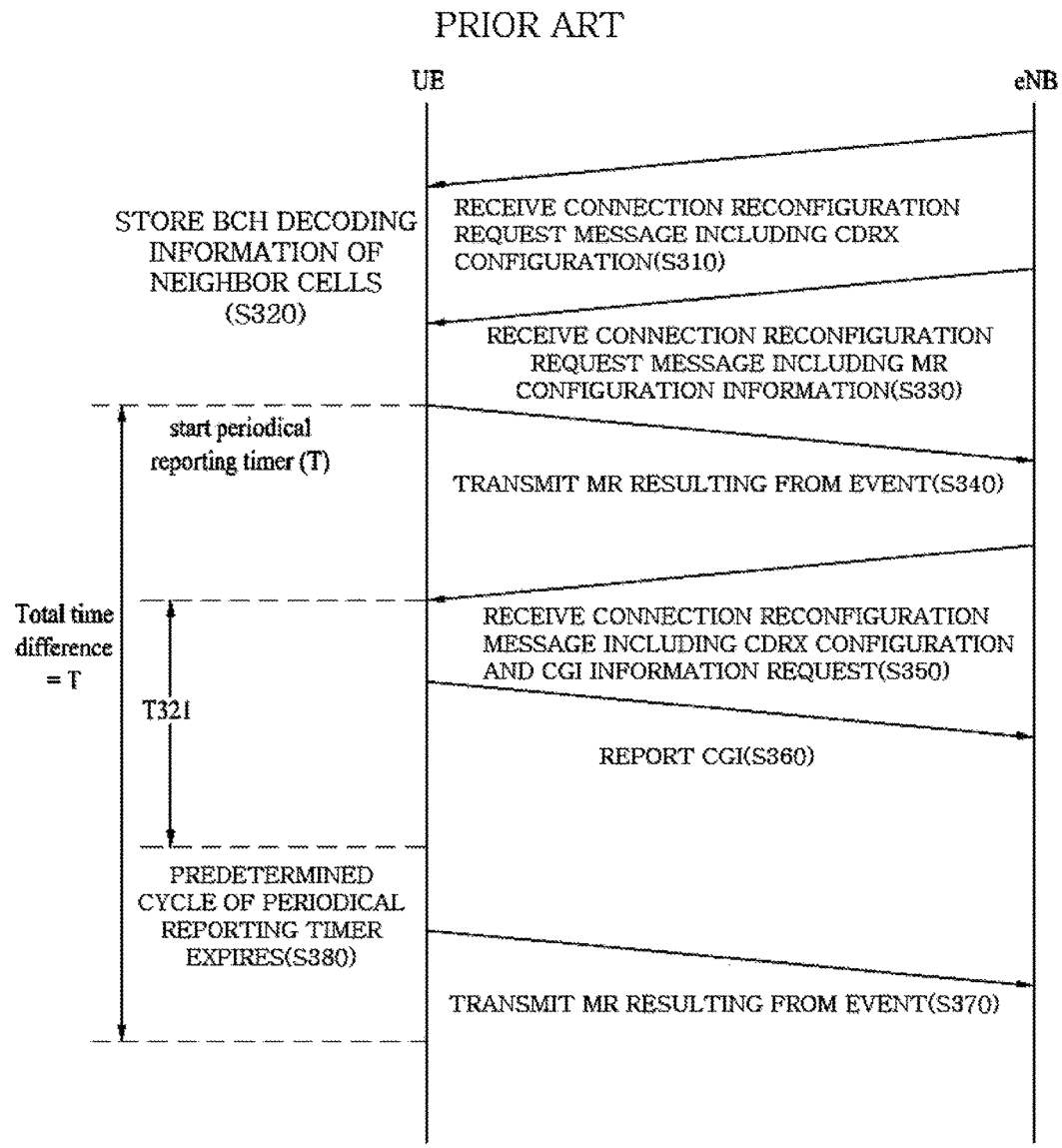
FIG. 2 illustrates a method of reporting cell global identity (CGI) information in a wireless communication method as another related art.
Figure 3:
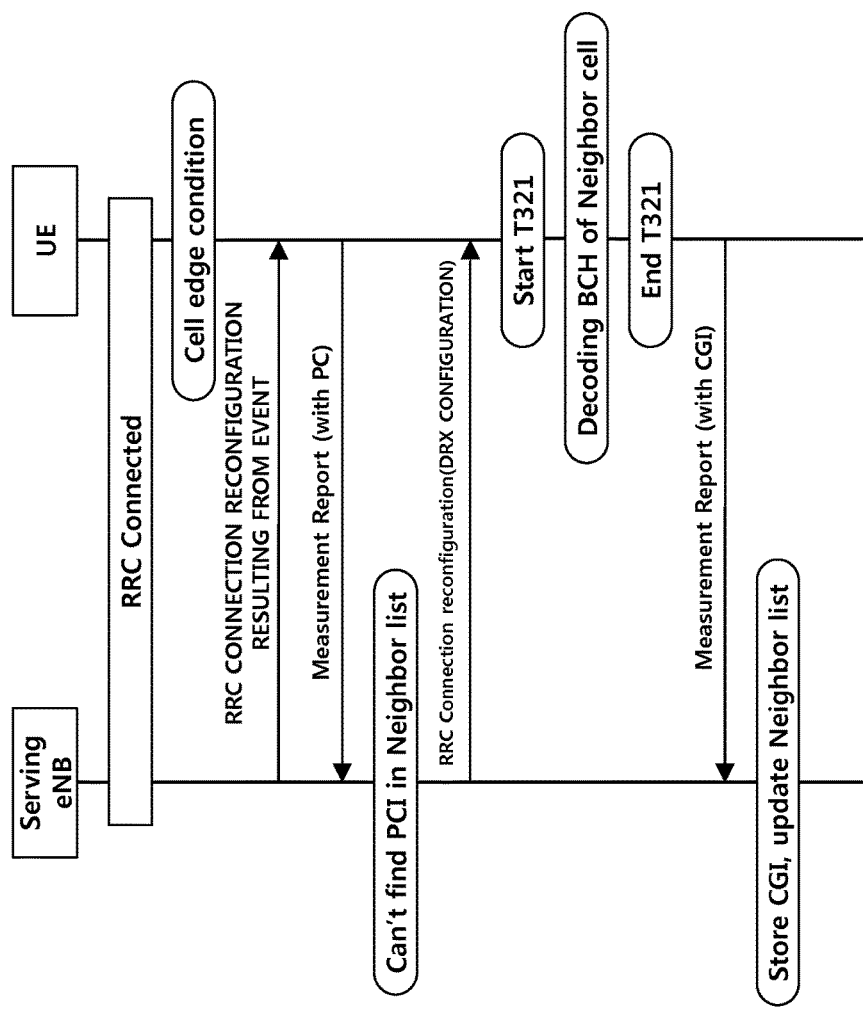
FIG. 3 illustrates a general automatic neighbor relation (ANR) operation procedure in a long term evolution (LTE) system.

FIG. 3 illustrates a general automatic neighbor relation (ANR) operation procedure in a Long Term Evolution (LTE) system. An ANR operation of reporting cell global identity (CGI) information of user equipment (UE) to a small cell or a macro cell evolved node base station (eNB) is generally performed in the following procedure:

(a) A serving eNB for UE among eNBs requests measurement reports (MRs) on neighbor eNBs from UE using a radio resource control (RRC) connection reconfiguration message resulting from an event.

(b) The UE performs measurement of the neighbor eNBs and then transmits an MR on the event whose condition is satisfied to the serving eNB.

(c) The serving eNB receives the MR, provides DRX configuration information of the UE using an RRC connection reconfiguration message, and requests CGI information from the UE.

(d) The UE acquires CGI information by decoding a broadcast channel (BCH) of a neighbor cell in a DRX state.

(e) The UE reports the CGI information to the serving eNB before a T321 cycle expires.

(f) The serving eNB stores the reported CGI information, and updates a neighbor list.

Figure 4:
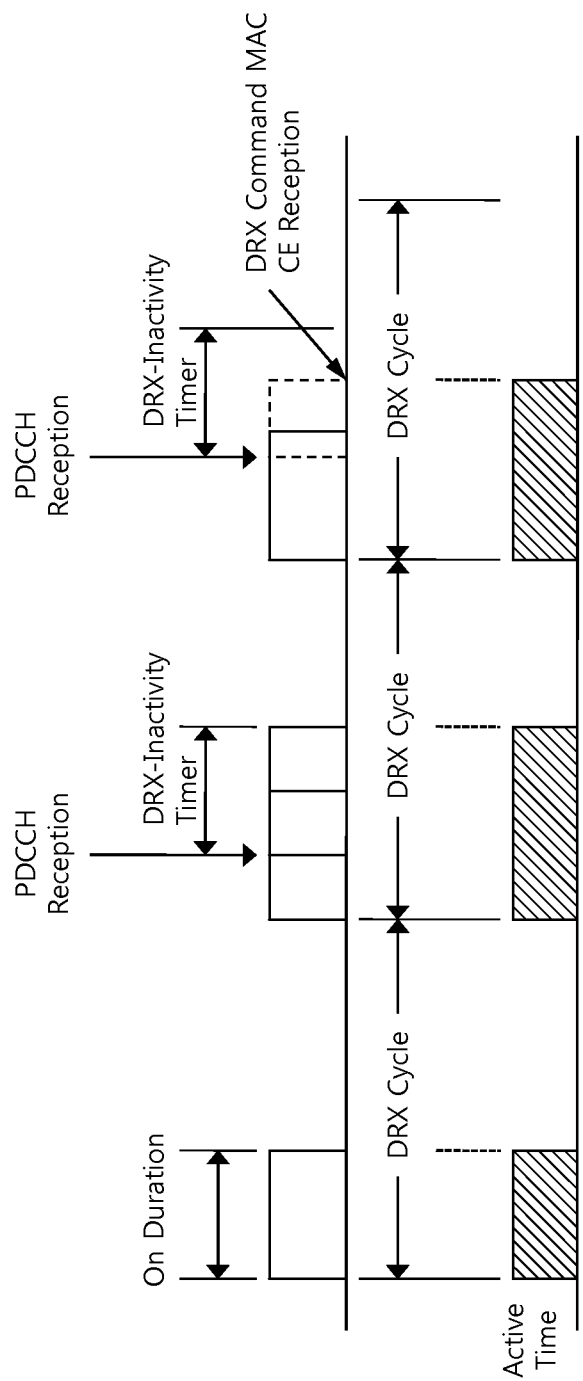
FIG. 4 illustrates a DRX operation according to a resource allocation method of a serving evolved node base station (eNB) in an LTE system.

FIG. 4 illustrates a DRX operation according to a resource allocation method of a serving eNB in an LTE system.

(a) DRX is periodically performed. In one DRX cycle, an active state is maintained during an on-duration period, and the remaining period is an inactive DRX period. During only the on-duration period, a connection with a physical downlink control channel (PDCCH) is established to perform DRX, and during the remaining DRX period, UE does not wait for reception, such that power consumption can be reduced.

(b) When a PDCCH is received during a DRX period, the active state is additionally maintained for the time of a DRX-inactivity timer after the time point of receiving the PDCCH.

(c) When there is continuous uplink/downlink data and a resource allocation method in which DRX of existing UE is not taken into consideration is used in a serving eNB, the UE is kept in the active state by the DRX-inactivity timer after an on-duration period.

According to the existing resource allocation method described above, when there is uplink/downlink data, the throughput of an uplink/downlink is not degraded because resources are allocated at all times. However, according to the existing resource allocation method, when there is uplink/downlink data, UE is not switched to the DRX state during a DRX-inactivity time because resources are allocated without consideration of DRX of the UE. Therefore, it is not possible to decode BCHs of neighbor cells. For this reason, the UE cannot report CGI information to an eNB, but repeats a process of performing measurement of neighbor eNBs and then transmitting an MR on an event whose condition is satisfied to the serving eNB, and the serving eNB also repeats a process of receiving the MR, providing a DRX configuration of the UE using an RRC connection reconfiguration message, and requesting CGI information from the UE. As a result, the eNB that receives no CGI information cannot perform an ANR operation which is a subsequent process. Accordingly, the serving eNB that has not performed an ANR operation cannot perform handover (HO), and thus UE at the edge of the service area of the serving eNB suffers from the degradation of service quality.

Figure 5:
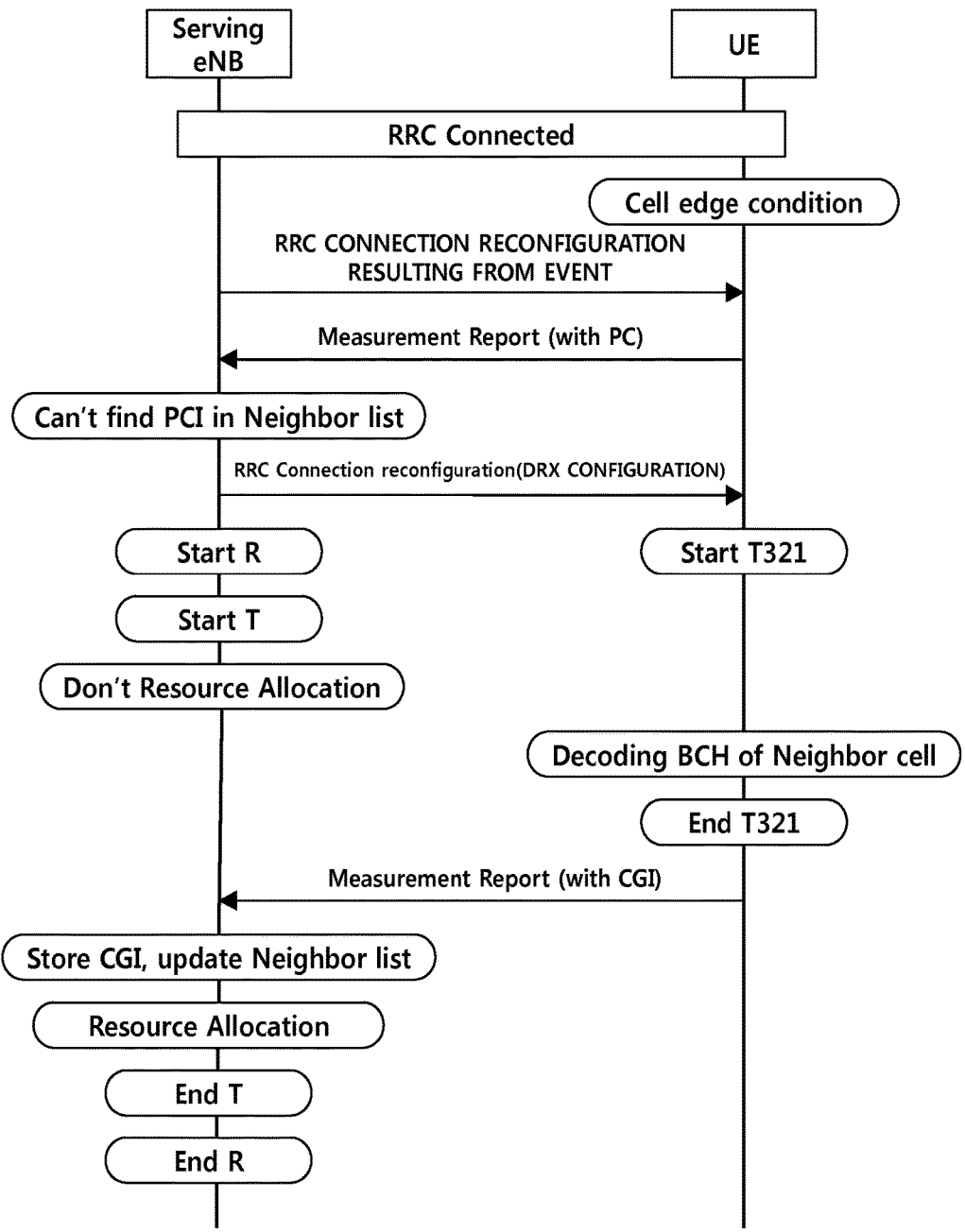
FIG. 5 illustrates an ANR operation procedure according to an exemplary embodiment of the present invention.

FIG. 5 illustrates an ANR operation procedure according to an exemplary embodiment of the present invention.

(a) A serving eNB for UE among eNBs requests MRs on neighbor eNBs from the UE using an RRC connection reconfiguration message resulting from an event.

(b) The UE performs measurement of the neighbor eNBs and then transmits an MR on the event whose condition is satisfied to the serving eNB.

(c) The serving eNB receives the MR, provides DRX configuration information of the UE using an RRC connection reconfiguration message, and requests CGI information from the UE.

(d) At this time, the serving eNB stops uplink/downlink data resource allocation to the UE from which CGI information has been requested to request CGI information, such that the UE can report CGI information through BCH decoding in a DRX period.

Also, in preparation for a case in which CGI information is not reported due to trouble in the UE, the serving eNB operates a timer set to have a cycle T with a repeat count R.

(e) The UE decodes a BCH of a neighbor cell to acquire CGI information in a DRX state.

(f) The UE reports the CGI information to the serving eNB before a T321 cycle expires.

(g) The serving eNB stores the reported CGI information and updates a neighbor list.

(h) The serving eNB resumes uplink/downlink data resource allocation to the UE from which CGI information has been requested and reported.

(i) The serving eNB stops the timer operated on the cycle T with the repeat count R.

Figure 6:
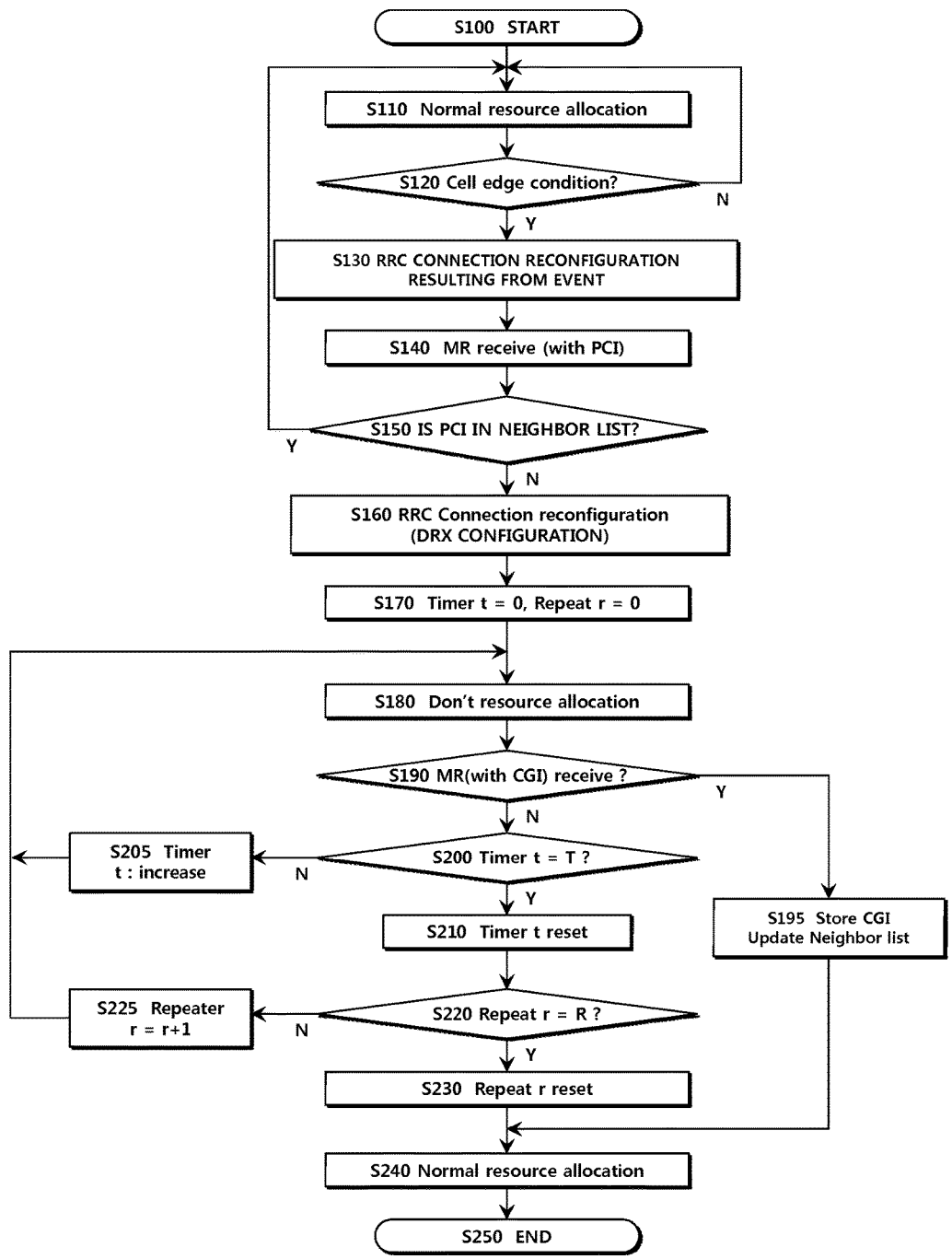
FIG. 6 is a flowchart illustrating an operating method of an eNB (serving eNB) based on a resource allocation method according to an exemplary embodiment of the present invention.

FIG. 6 is a flowchart illustrating an operating method of an eNB (serving eNB) based on a resource allocation method according to an exemplary embodiment of the present invention. The operating method of an eNB will be described below according to operations.

An operating method of an eNB for CGI information reporting in a wireless communication system includes the following operations:

S100: The eNB starts a resource allocation operation.

S110: The eNB provides an uplink/downlink data resource allocation service to pieces of UE in a service area.

S120: The eNB determines whether or not UE in need of an HO service at the edge of the service area (cell edge) is among the pieces of UE provided with the uplink/downlink data resource allocation service.

When it is determined in operation S120 that there is no UE in need of the HO service, the process proceeds to operation S110, and the uplink/downlink data resource allocation service is continuously provided. On the other hand, when there is UE in need of the HO service, the process proceeds to operation S130.

S130: As the event occurs, the eNB (serving eNB) requests MRs on neighbor eNBs from the UE using an RRC connection reconfiguration message.

S140: The UE performs measurement of the neighbor eNBs and then transmits an MR and a physical cell identifier (PCI) relating to the event whose condition is satisfied to the eNB (serving eNB).

S150: The eNB determines whether the PCI received from the UE is in a neighbor list.

When it is determined in operation S150 that the PCI received from the UE is in the neighbor list, the process proceeds to operation S110, and the uplink/downlink data resource allocation service is continuously provided. On the other hand, when the PCI is not in the neighbor list, the process proceeds to operation S160.

S160: The eNB receives the MR, provides DRX configuration information of the UE using an RRC connection reconfiguration message, and requests CGI information from the UE.

S170: The eNB initializes a timer value t and a repeat counter value r.

S180: The eNB stops resource allocation to the UE.

S190: The eNB checks whether or not an MR including a CGI is transmitted from the UE.

S195: When it is checked in operation S190 that an MR including a CGI is received from the UE, the eNB stores the CGI and updates the neighbor list.

S240: Subsequent to operation S195, the eNB resumes resource allocation to the UE.

S250: The eNB finishes the resource allocation operation.

When it is checked in operation S190, in which the eNB checks whether or not an MR including a CGI is transmitted from the UE, that neither an MR nor a CGI is transmitted from the UE, the process proceeds to next operation S200.

S200: It is checked whether the timer value t is a set value T.

S205: When it is checked in operation S200 that the timer value t is not the set value T, the timer value t is increased, and the process proceeds to operation S180, in which the eNB stops resource allocation to the UE.

S210: When it is checked in operation S200 that the timer value t is the set value T, the timer value t is initialized.

S220: Subsequent to operation S210, it is checked whether the repeat counter value r is a set value R.

S225: When it is checked in operation S220 that the repeat counter value r is not the set value R, the repeat counter value r is increased by one, and the process proceeds to operation S180, in which the eNB stops resource allocation to the UE.

S230: When the repeat counter value r is the set value R, the repeat counter value r is initialized.

S240: Subsequent to operation S230, the eNB resumes resource allocation to the UE.

S250: The eNB finishes the resource allocation operation.

According to a resource allocation method based on an exemplary embodiment of the present invention, when there is uplink/downlink data in a small cell or a macro cell, a serving eNB stops data allocation to UE and request MRs on neighbor eNBs. Therefore, the UE can be switched to the DRX state during a DRX-inactivity time. In this way, decoding of a BCH of a neighbor cell is ensured, and the UE performs reporting of CGI information. As a result, the serving eNB can receive the CGI information report, perform an ANR operation, and maintain service quality through effective HO of UE at the edge of the service area of the serving eNB.

According to exemplary embodiments of the present invention, when there is uplink/downlink data, a serving eNB stops data allocation to UE and requests MRs on neighbor eNBs, such that the UE can be switched to the DRX state during a DRX-inactivity time.

Also, exemplary embodiments of the present invention ensure decoding of a BCH of a neighbor cell, such that service quality can be maintained through reporting of CGI information.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. An operating method of an evolved node base station (eNB) for cell global identity (CGI) information reporting in a wireless communication system, the method comprising:
   requesting, by a serving eNB for user equipment (UE) among eNBs, measurement reports (MRs) on neighbor eNBs from the UE using a radio resource control (RRC) connection reconfiguration message resulting from an event;
   performing, by the UE, measurement of the neighbor eNBs and then transmitting an MR on the event whose condition is satisfied to the serving eNB;
   receiving, by the serving eNB, the MR, providing discontinuous reception (DRX) configuration information of the UE using an RRC connection reconfiguration message, and stopping uplink/downlink data resource allocation to the UE to request CGI information from the UE, wherein the UE is switched to a DRX state during a DRX-inactivity time to enable the UE to: (i) decode a broadcast channel (BCH) of a neighbor cell and (ii) report the CGI information to the serving eNB; and
   while in the DRX state during a DRX inactivity time decoding, by the UE, the broadcast channel (BCH) of the neighbor cell thereby acquiring CGI information while in the DRX state; and
   reporting, by the UE, the CGI information to the serving eNB before a T321 cycle expires; then
   storing, by the serving eNB, the reported CGI information, and updating a neighbor list;

resuming uplink/downlink data resource allocation to the UE from which CGI information has been requested and reported; and stopping, by the serving eNB, a timer operated on a cycle T with a repeat count R.

2. The operating method of claim 1, wherein the receiving, by the serving eNB, of the MR, the providing of the DRX configuration information of the UE using the RRC connection reconfiguration message, and the requesting of CGI information from the UE further comprise operating, by the serving eNB,; the timer set to have the cycle T with the repeat count R in preparation for a case in which CGI information is not reported due to trouble in the UE.

* * * * *